R. MIEHLE.
FUEL AND WATER REGULATOR FOR STEAM GENERATORS.
APPLICATION FILED JUNE 12, 1908.
1,026,693.
Patented May 21, 1912.
2 SHEETS—SHEET 2.
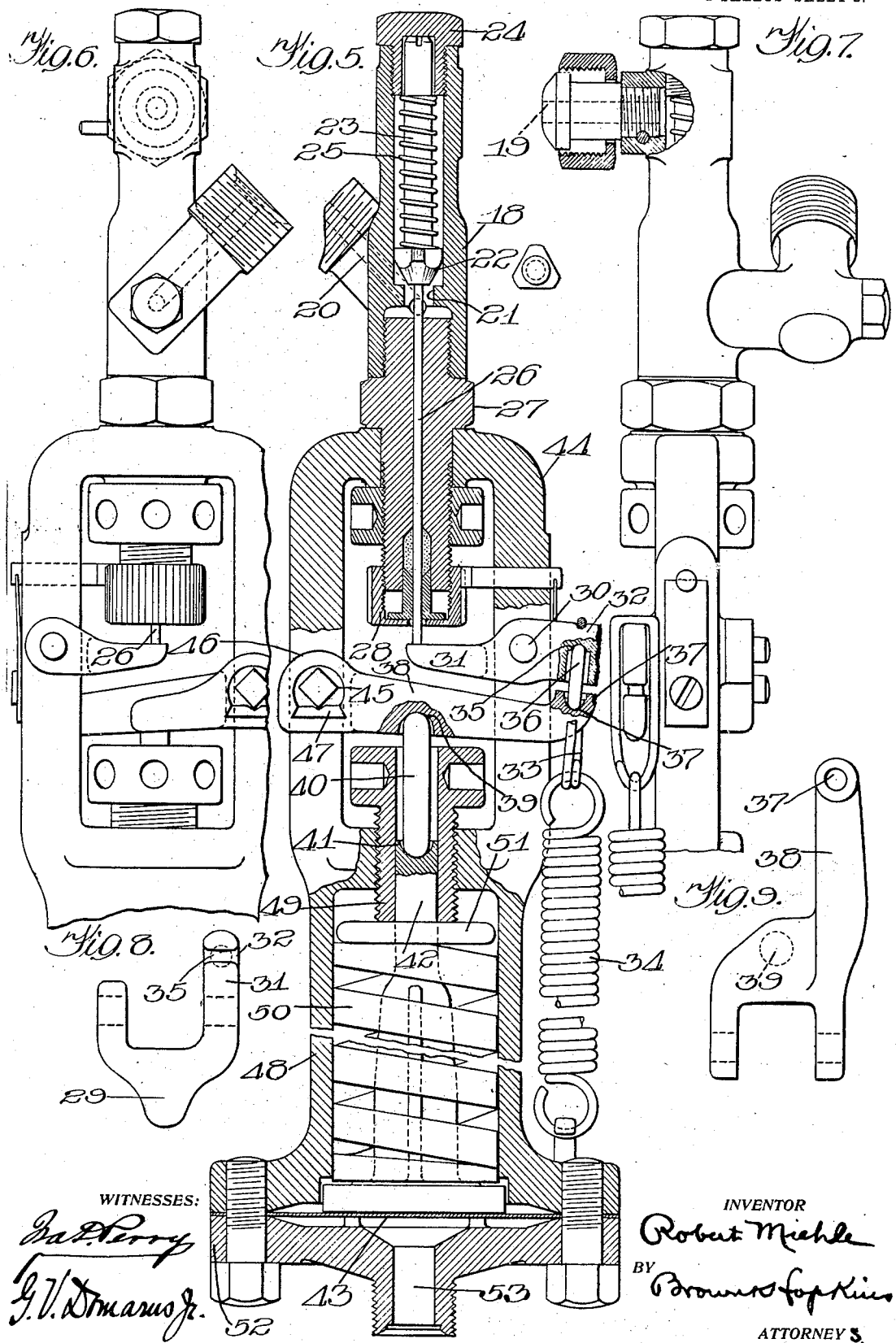

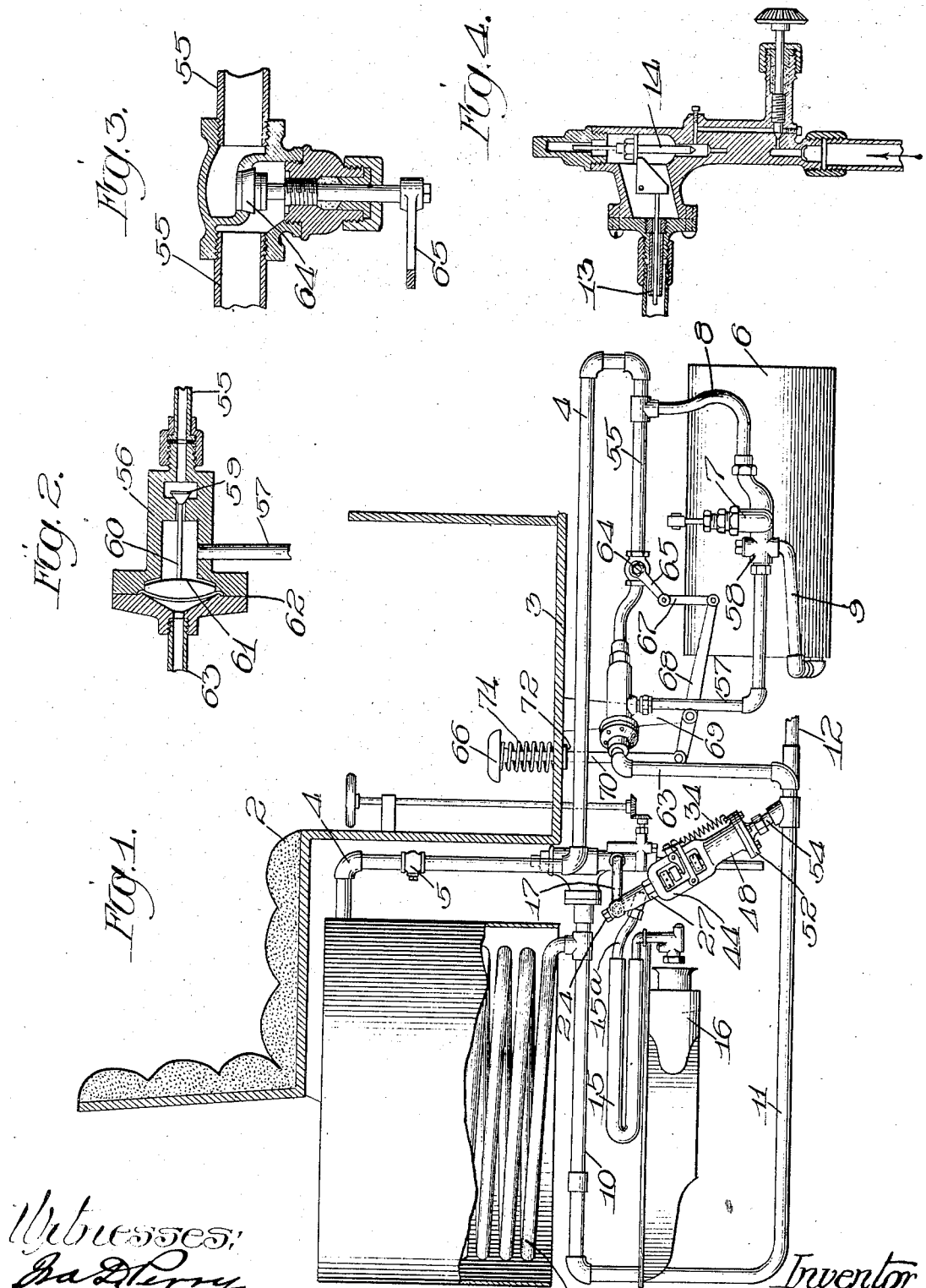

UNITED STATES PATENT OFFICE.

ROBERT MIEHLE, OF CHICAGO, ILLINOIS.

FUEL AND WATER REGULATOR FOR STEAM-GENERATORS.

1,026,693.  Specification of Letters Patent.  Patented May 21, 1912.

Application filed June 12, 1908. Serial No. 438,097.

*To all whom it may concern:*

Be it known that I, ROBERT MIEHLE, a citizen of the United States, residing at Chicago, in the county of Cook and State of Illinois, have invented certain new and useful Improvements in Fuel and Water Regulators for Steam-Generators, of which the following is a full, clear, and exact specification.

This invention relates to improvements for regulating the fluid fuel and the water or other liquid employed for flash or semi-flash type of generators or boilers in which it is desired to maintain a uniform pressure notwithstanding wide variations in the amount of steam consumed. This makes it necessary to vary the fuel supply as well as the water supply in accordance with the variations in the steam pressure.

In my pending application, Serial No. 367,618, filed April 11, 1907, I have shown and described a fuel regulating system for steam boilers or generators in which the fuel is controlled or regulated both by thermostatic means influenced alone by the temperature of the steam, and by pressure controlled means influenced only by the pressure of the steam; in my application Serial No. 394,605, filed September 26, 1907, I show and describe a fuel and water regulator for steam boilers or generators in which the fuel is controlled by thermostatic means influenced only by the temperature of the steam, and also by a flow regulator which serves at one and the same time to control the water supply and also supply of fuel by the pressure of the steam acting through the intermediary of the water.

My present invention has for its primary object to combine with a pressure controlled means which controls the fuel by the direct pressure of the steam in the generator, a means for controlling the water supply in accordance with the requirements of the generator acting by the direct pressure of the steam in the generator, and being also operable manually at will whereby there is produced an improved efficient system for regulating the fuel and the water supplies in accordance with the requirements of the apparatus, and with great nicety. In systems of this character it is customary to control the fluid fuel passage by means of a comparatively small valve which is desirably provided with a comparatively small needle-like stem to avoid leakage of the fuel which might occur around the stem if a larger stem were employed, as this would necessitate a comparatively loose packing to avoid undue friction. These stems are usually acted upon by the steam pressure for either opening or closing the valve, and in either event the severe strain often results in bending the stem and rendering the valve inoperative. The invention is designed to overcome these difficulties, and has for its further object to provide improved means whereby the valve may be moved in both directions through the intermediary of a spring or yielding member, so that no matter how great the generator pressure may become, the valve stem will always be subjected to a uniform pressure, gaged according to the requirements.

A still further object of the invention is to provide an improved pressure regulator for the fuel in which the various parts will be relieved of a large percentage of the friction and contrary strains heretofore encountered in apparatus of this nature.

With a view to the attainment of these ends and the accomplishment of certain other objects which will hereinafter appear, the invention consists in the novel arrangement, combination and construction which will now be described with reference to the accompanying drawings, and more particularly pointed out in the claims.

In the said drawings, Figure 1 is a general view of a steam generator system embodying this invention as applied to an automobile, the same being shown in side elevation, partly in section. Fig. 2 is an enlarged detail longitudinal sectional view of the pressure regulator for opening the water by-pass valve automatically. Fig. 3 is a longitudinal sectional view of the manually operable by-pass valve. Fig. 4 is a longitudinal sectional view of parts of the thermostat and its valves. Fig. 5 is an enlarged longitudinal section of the fuel controlling valve and the pressure controlled means for controlling the said valve. Fig. 6 is an elevation thereof partly broken away, looking at the reverse side. Fig. 7 is a similar elevation looking from the right in Fig. 6. Fig. 8 is a detail view of one of the levers. Fig. 9 is a similar view of the other one of the levers of the steam pressure controlled device.

In illustrating the invention I have elected to show it in connection with a flash type of steam generator 1 as applied to an automobile or motor vehicle, the seat of which is connected at 2 to the floor of the body which provides foot room for the operator at 3. It is customary and desirable with steam generators of this type to admit the water supply at the top, as by a pipe 4, having a check valve 5, which is supplied with water or other liquid to be converted into fluid under pressure from a tank 6 by means of a suitable pump 7 having pipe connections 8, 9 with the tank and the pipe 4 respectively. The steam generated from the water thus admitted to the coil 1 is ordinarily conducted to the engine (not shown) from the bottom of the coil through suitable pipe connections 10, 11, 12, and in one of these connections, the connection 10, is ordinarily located the thermostat 13 arranged to control a valve 14, which regulates the supply of fuel passing to the retort 15 of the burner 16 through pipe connection or fuel passage 17, thus controlling the amount of fuel passing to the burner in accordance with the temperature of the steam in the generator, and serving to shut off the supply of fuel or reduce it as such temperature rises. The fluid fuel on its way to the retort 15 of the burner through the pipe 17 passes into a valve housing 18 having an inlet port or passage 19 connected with the pipe 17, and an outlet port or passage 20 connected by pipe 15$^a$ with retort 15, the former port arranged above and the latter port below a valve seat 21 provided with a fuel regulating valve 22 arranged in this housing and preferably provided with a stem 23 guided at its upper end in a screw cap 24 and carrying a spring 25 which bears between said cap and the body of the valve 22 for closing the valve and thereby shutting off the supply of fuel to the burner when the valve is not otherwise resisted or controlled from below. This spring 25 serves to close the valve 22 when the steam pressure in the generator rises above a certain degree, and the valve is opened when the pressure falls below a certain degree by a stem 26 connected with or operatively related to the under side of the valve and arranged in a suitable guide 27 provided with a stuffing box 28 through the lower end of which the stem 26 projects. This stem 26 is desirably of needle like form and of comparatively small diameter, so that the high pressure of the stuffing box 28 requisite for preventing leakage of the fluid fuel around the stem will not offer such great resistance to the movement of the stem as to render the operation of the valve 22 sluggish and uncertain, and, as before intimated, in order that the pressure of the generator against the stem 26 for opening the valve may not act so severely thereon as to injure the stem, such pressure is applied through the intermediary of a suitable yielding device, as a spring. A convenient and efficient mechanism for accomplishing this is better shown in Fig. 5 of the drawings, in which it is seen that the protruding end of the stem 26 is engaged by one end 29 of a lever pivoted on pin 30 and having its other end 31 provided with a seat 32 in which engages the upper end of a link 33, whose lower end is connected with a fixed spring 34. In the lower side of the arm 31 is formed a bearing 35 against which engages the upper end of an anti-friction bearing pin 36 having a rounded end engaging the rounded bearing surface 35, and whose lower rounded end engages a similar bearing 37 formed in the upper side of one arm 38 of a lever having its opposite end pivoted in any suitable way and provided at a point intermediate its pivotal point to the bearing 37, with a bearing 39 in which engages the upper end of an anti-friction bearing pin 40, whose lower end is seated in a suitable bearing 41 formed in the end of an abutment rod 42 which receives the pressure of the steam in the generator in any suitable way, as through the medium of a diaphragm or other movable abutment 43. Thus it will be seen that while the particular form of anti-friction bearings which have been thus described between the levers and their coöperating parts are not absolutely essential for the prevention of injury to the stem 26, they form a simple and frictionless or practically frictionless intermediary through which the steam pressure overcomes the pressure of the spring 34 in its unseating tendency against the valve 22 on the one hand, and the spring 34 on the other hand overcomes the pressure of the spring 25 against the valve 22 in its seating tendency. Hence it will be seen that the unseating of the valve 22 is effected solely by the force of the spring 34 acting to move the valve away from its seat until the upper end of the stem 23 engages the cap 24, while the seating of the valve is due to a force only as great as the pressure of the spring 25, and both the seating and unseating forces are not in any wise dependent upon the steam pressure beyond a certain degree, which degree is the pressure of the spring 34.

The mechanism thus described for controlling the valve 23 may be assembled and connected in any suitable way. In this example, the guide 27 is secured in a yoke 44 which forms a support on one side for the pivot or fulcrum 30 of the lever 29, 31, and on the other side for a fulcrum 45 for the lever 38, this fulcrum 45 being angular and passing through eyes 46 in the lever 38, these eyes being provided with suitable bearings 47 for the knife edge of the fulcrum. This yoke 44 is shown with a cylinder or chamber 48 in one end of which is screwed a hollow adjusting screw 49 which forms at once a guide for the plunger rod 42 and a means of adjusting the usual spring 50 employed for returning the diaphragm 43 against the steam pressure of the generator, in this instance a washer 51 being interposed between screw 49 and spring 50 to form a bearing for the screw. To one end of the cylinder 48 is secured a cap 52 which forms with the cylinder a diaphragm chamber, and to which the steam pipe 11 is connected by a passage 53 and connection 54.

In systems of this character employed on motor vehicles, it is customary and desirable to operate the pump 7 continually by some positive connection with the moving parts of the engine, and it is of course desirable that the water thus supplied be diverted from the boiler or generator when the steam pressure therein rises to the required degree, and to be automatically directed into the generator when conditions require a further supply. To that end the pump is provided with a by-pass which is automatically opened by the steam pressure and the supply from the pump diverted from the boiler to the intake side of the pump. This by-pass in the example of the invention shown in the drawing comprises a pipe connection 55 which communicates with the pipes 4 and 8 at one end, and at the other end with a valve housing 56 also constituting a part of the by-pass passage, and with this valve housing communicates another part of the by-pass passage in the form of pipe 57 which extends to the intake valve 58 of the pump 7, thus together with the pipe 8 constituting a complete circuit between the intake and discharge sides of the pump. In the valve housing 56 is located a suitable valve 59 which is adapted to close with the water pressure coming from the discharge side of the pump, and this valve is connected by a stem 60 with a diaphragm or abutment 61 arranged in a diaphragm chamber 62 and subjected to the boiler pressure through a pipe connection 63 with the pipe 11, so that when the boiler pressure rises above a certain degree, the diaphragm 61 will be deflected and the valve 59 opened, thereby allowing the water to take the course of least resistance directly back to the intake side of the pump instead of rising into the generator against the pressure of steam therein. For ordinary use the resistance of the diaphragm 61 is so gaged as to open the valve 59 and discontinue the supply of water to the generator when the pressure of the steam is sufficient for general running, but when the machine encounters some unusual resistance, such as heavy road or steep grade, requiring an abnormal pressure and an unusually large consumption of steam, it becomes necessary or desirable to overcome the automatic effect of the automatic by-pass valve 59 and to keep the by-pass closed until the requirements for extra steam and high pressure have passed. For that purpose the by-pass is provided with a manually controlled valve capable of closing it even though the pressure of the steam might open it at the valve 59. This manually controlled valve is shown in the pipe 55 as an ordinary plug valve 64 having a crank or lever 65 suitably connected with a pedal or foot button 66 arranged above the floor 3. In the example shown the arm 65 is connected by a link 67 with one end of a lever 68 carried on bracket 69 and having its other end pivoted to the lower end of a stem 70 which projects through the floor and carries the pedal 66, a spring 71 being interposed between the pedal and the floor for holding the valve 64 normally open, and a suitable stop 72 being provided on the stem 70 for limiting its upward movement beyond the open position of the valve.

I claim:

1. In a regulator for steam boilers, the combination of a steam generator of the flash or semi-flash type, a thermostatic fuel regulator subjected to the temperature of the steam in the generator, a burner having its fuel supply controlled by said thermostatic regulator, a steam pressure fuel regulator subjected to the pressure of the steam in the generator and operatively connected to the burner for controlling the supply of fuel thereto, a liquid forcing means for supplying the generator with the liquid to be vaporized, and pressure controlled means operatively related to said liquid forcing means and to the steam generator for automatically diverting the liquid supply from the generator when the pressure in the generator rises above a certain degree.

2. In a regulator for steam boilers, the combination of a steam generator of the flash or semi-flash type, a thermostatic fuel regulator subjected to the temperature of the steam in the generator, a burner having its fuel supply controlled by said thermostatic regulator, a steam pressure regulator subjected to the pressure of the steam of the generator and operatively related to the burner also for controlling the fuel supply thereof, a liquid forcing means for supplying the generator with a liquid to be vaporized, means operatively related to the liquid forcing means and subjected to the steam pressure of the generator for diverting the liquid supply from the generator when the pressure in the generator rises above a certain degree, and manually operable means for rendering the last said means ineffectual at will.

3. In a regulator for steam boilers, the combination of a steam generator of the flash or semi-flash type, a fluid fuel burner for heating the same, a thermostatic fuel regulator subjected to the temperature of the steam in the generator for controlling the supply of fuel to the burner, a liquid forcing means for supplying the generator with a liquid to be vaporized, means operatively related to the liquid forcing means and subjected to the pressure of the steam in the generator for diverting the liquid from the generator automatically when the pressure of the steam rises above a certain degree, and manually operable means for rendering the last said means ineffectual at will.

4. In a regulator for steam generators, the combination of a steam generator, a burner for heating the same, thermostatic means subjected to the heat of the steam in the generator for controlling the supply of fuel to the burner, steam pressure fuel controlling means operatively related to the burner and subjected to the pressure of the steam of the generator for reducing the supply of fuel to the burner when the pressure of the generator rises above a certain degree, liquid forcing means for feeding a liquid to be vaporized to the generator, a by-pass passage connecting the inlet and outlet sides of the liquid forcing means together, a valve for closing said by-pass passage, steam pressure controlled means subjected to the pressure of the steam in the generator for closing said valve when the generator pressure rises above a certain degree, a manually operable valve, situated in the by-pass between the first said valve and the outlet side of the liquid forcing means, means for holding the said manually operable valve normally open, and means for closing said manually operable valve at will.

5. In a regulator for steam generators, the combination of a steam generator, a burner for heating the same, a valve for controlling the fuel supply to the generator, an elastic means for opening the said valve, and means subjected to the pressure of the steam in the generator for overcoming the resistance of said elastic means and allowing the valve to be closed.

6. In a regulator for steam generators, the combination of a steam generator, a burner for heating the same, a valve for controlling the supply of fuel to the burner, an elastic means for closing the valve, an elastic means of greater power than the first said elastic means for holding the valve open, and means for overcoming the resistance of the second said elastic means by the pressure of the steam in the generator and allowing the valve to close.

7. In a regulator for steam generators, the combination of a steam generator, a burner for heating the same, a valve for controlling the supply of fuel to the burner, a compound lever having operative relation to the valve for opening it, an elastic means for moving said compound lever in the opening direction of said valve, and means subjected to the pressure of the steam in the generator for overcoming the power of said elastic means and allowing the valve to close.

8. In a regulator for steam generators, the combination of a steam generator, a burner for heating the same, a valve for controlling the fuel supply to the burner, a compound lever operatively related to the valve for opening the same, a spring engaging one of the components of said lever and forcing it toward the other in the opening direction of said valve, and means subjected to the pressure of the steam in the generator having operative connection with the last said component of the lever for moving the latter and overcoming the power of said spring.

9. In a regulator for steam generators, the combination of a steam generator, a burner for heating the same, a valve for controlling the supply of fuel to the burner, a stem for opening said valve, a pivoted lever engaging said stem at one end, a second pivoted lever engaging the other end of the first said lever, a spring for forcing the first said lever against the stem, and an abutment subjected to the pressure of the steam of the generator and having operative relation to the second said lever for overcoming the power of said spring to allow the valve to close.

10. In a regulator for steam generators, the combination of a steam generator, a burner for heating the same, a valve for controlling the supply of fuel to the burner, a pivoted lever having an operative relation to the valve for opening it, a second pivoted lever, an anti-friction bearing pin situated between said levers for imparting the movement of one to the other, a spring for moving said levers in the opening direction of said valve, and means for overcoming the power of said spring by the generator pressure for allowing the valve to close.

11. In a regulator for steam generators, the combination of a steam generator, a burner for heating the same, a valve for controlling the supply of fuel to the burner, a pivoted lever operatively related to the valve for opening the same, an elastic means connected with the lever for moving it in the opening direction of said valve, an abutment subjected to the pressure of the steam of the generator for overcoming the power of said spring, a plunger operatively related to the abutment, and an anti-friction bearing pin arranged lengthwise of the movement of said plunger and situated between it and the said lever for imparting the movement of the plunger to the lever.

12. In a regulator for steam generators, the combination of a steam generator, a burner for heating the same, liquid forcing means for feeding a liquid to be vaporized to the generator, a by-pass passage connecting the inlet and the outlet sides of the liquid-forcing means together, a valve for closing said by-pass passage, steam pressure controlled means subjected to the pressure of the steam in the generator for closing said valve when the generator pressure rises above a certain degree, a manually operable valve situated in the by-pass between the first said valve and the outlet side of the liquid-forcing means, means for holding said manually operable valve normally open, and means for closing said manually operable valve at will.

13. In a regulator for steam generators, the combination of a steam generator, a burner for heating the same, thermostatic means subjected to the heat of the steam in the generator for controlling the supply of fuel to the burner, liquid-forcing means for feeding a liquid to be vaporized to the generator, a by-pass passage connecting the inlet and the outlet sides of the liquid forcing means together, a valve for closing said by-pass passage, steam pressure controlled means subjected to the pressure of the steam in the generator for closing said valve when the generator pressure rises above a certain degree, a manually operable valve situated in the by-pass between the first said valve and the outlet side of the liquid-forcing means, means for holding the said manually operable valve normally open, and means for closing said manually operable valve at will.

14. In a regulator for steam generators, the combination of a steam generator, a burner for heating the same, steam pressure fuel controlling means operatively related to the burner and subjected to the pressure of the steam in the generator for reducing the supply of fuel to the burner when the pressure of the generator rises above a certain degree, liquid forcing means for feeding a liquid to be vaporized to the generator, a by-pass passage connecting the inlet and the outlet sides of the liquid-forcing means together, a valve for closing said by-pass passage, steam pressure controlled means subjected to the pressure of the steam in the generator for closing said valve when the generator pressure rises above a certain degree, a manually operable valve situated in the by-pass between the first said valve and the outlet side of the liquid-forcing means, means for holding the said operable valve normally open, and means for closing said manually operable valve at will.

15. In a regulator for steam generators, the combination of a generator, a burner for heating the same, a valve for controlling the supply of fuel to the burner, a compound lever having operative relation to the valve for opening it, means for moving said compound lever in the opening direction of said valve, and means subjected to the pressure of the steam in the generator for overcoming the power of the last said means, whereby the valve will close.

16. In a regulator for steam generators, the combination of a generator, a burner for heating the same, a valve for controlling the fuel supply to the burner, a compound lever operatively related to the valve for opening it, a yoke to which the components of the lever are respectively pivoted, a spring engaging one of the components of said lever for forcing it toward the other in the opening direction of the valve, and means subjected to the pressure of the steam in the generator having operative connection with the last said component of the lever for moving the latter and overcoming the power of the spring.

17. In a regulator for steam generators, the combination of a steam generator, a burner for heating the same, a valve for controlling the fuel supply to the generator, a stem for opening the valve, a yoke into which the stem passes, a lever pivoted to one arm of the yoke and engaging the stem at one end, a second lever pivoted to the other arm of the yoke, means connecting the levers for imparting the movement of one lever to the other, means for moving the levers in the opening direction of the valve, and means for causing the valve to close.

18. In a regulator for steam generators, the combination of a steam generator, a burner for heating the same, a valve for controlling the fuel supply to the generator, a stem for opening the valve, a yoke into which the stem passes, a lever pivoted to one arm of the yoke and engaging the stem at one end, a second lever pivoted to the other arm of the yoke, means connecting the levers for imparting the movement of one lever to the other, means for moving the levers in the opening direction of the valve, and means for overcoming the pressure of the last said means whereby the valve will close.

19. In a regulator for steam generators, the combination of a steam generator, a burner for heating the same, a valve for controlling the fuel supply to the generator, a stem for opening the valve, a yoke into which the stem passes, a lever pivoted to one arm of the yoke and engaging the stem at one end, a second lever pivoted to the other arm of the yoke, means connecting the levers for imparting the movement of one lever to the other, means for moving the levers in the opening direction of the valve, and means controlled by the generator pressure for overcoming the power of the last said means whereby the valve will close.

20. In a regulator for steam generators, the combination of a steam generator, a burner for heating the same, a valve for controlling the supply of fuel to the burner, a stem for operating the valve, a yoke into which the stem projects, a lever pivotally connected to the yoke with one end engaging the stem, a second lever pivoted to the yoke, an operative connection between the levers whereby the movement of one will move the other, means for moving the last said lever in the opening direction of the valve, and means subjected to the pressure of the steam in the generator for overcoming the power of the last said means.

21. In a regulator for steam generators, the combination of a steam generator, a burner for heating the same, a valve for controlling the supply of fuel to the burner, a stem for operating the valve, a yoke into which the stem projects, a lever pivotally connected to the yoke with one end engaging the stem, a second lever pivoted to the yoke, an operative connection between the levers whereby the movement of one will move the other, means for moving the last said lever in the opening direction of the valve, and means subjected to the pressure of the steam in the generator for overcoming the power of the last said means, the said connecting means between the levers embodying a bearing element disposed between the levers with its extremities recessed into the respective elements.

22. In a regulator for steam generators, the combination of a steam generator, a burner for heating the same, a valve for controlling the supply of fuel to the burner, a pivoted lever having an operative relation to the valve for moving it in one direction, a second pivoted lever, said levers being so disposed with respect to each other, that the movement of one will be imparted to the other, means for moving the levers to move the valve in one direction, and means for overcoming the said recited means whereby the valve will move in the opposite direction.

In testimony whereof I have signed my name to this specification, in the presence of two subscribing witnesses, on this 10th day of June, A. D. 1908.

ROBERT MIEHLE.

Witnesses:
C. H. SEEM,
J. H. JOCHUM, Jr.